United States Patent
Hocken et al.

(10) Patent No.: US 7,177,770 B1
(45) Date of Patent: Feb. 13, 2007

(54) MASS AIR FLOW METERING DEVICE AND METHOD

(75) Inventors: Lary Robert Hocken, Davison, MI (US); Gregory Paul Gee, Waterford, MI (US); David Paul Prawdzik, Grand Blanc, MI (US); Paul Louis Du Bois, Flint, MI (US); James Craig Smith, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/212,014

(22) Filed: Aug. 25, 2005

(51) Int. Cl.
*G06F 19/00* (2006.01)

(52) U.S. Cl. .......................... 702/45; 702/33

(58) Field of Classification Search ................ 73/1.16, 73/204.11, 204.23, 204.25, 861.01, 861.02, 73/861.03; 123/391, 392; 374/54; 700/281, 700/283, 284, 285; 702/45, 46, 48, 49, 33
See application file for complete search history.

(56) References Cited

U.S. PATENT DOCUMENTS

| | | | |
|---|---|---|---|
| 4,457,167 A * | 7/1984 | Sumal | 73/118.1 |
| 5,681,989 A * | 10/1997 | Kanke et al. | 73/118.2 |
| 6,279,394 B1 | 8/2001 | Svobda et al. | |
| 6,397,673 B1 * | 6/2002 | Kanke et al. | 73/204.11 |
| 6,508,117 B1 | 1/2003 | DuBois et al. | |
| 6,813,570 B2 | 11/2004 | Gee | |
| 2004/0079341 A1 | 4/2004 | Fuwa | |
| 2004/0103880 A1 | 6/2004 | Hirayama et al. | |

* cited by examiner

*Primary Examiner*—John Barlow
*Assistant Examiner*—Douglas N Washburn
(74) *Attorney, Agent, or Firm*—Paul L. Marshall

(57) ABSTRACT

An airflow metering device, including a conventional airflow sensing device signally connected to a signal processor is shown, having an input flow signal correlatable to a magnitude of mass air flowing past the airflow sensing device. The signal processor is operable to determine a flow correction factor based upon a direction and magnitude of the mass air flowing past the airflow sensing device. The output of the airflow metering device is an accurate measure of airflow, and comprises the input flow signal of the airflow sensing device adjusted by the flow correction factor determined by the signal processor.

16 Claims, 11 Drawing Sheets

MASS AIR FLOW METERING DEVICE AND METHOD

TECHNICAL FIELD

This invention pertains generally to internal combustion engine control systems, and more specifically to a method and apparatus to accurately meter flow of air into the internal combustion engine.

BACKGROUND OF THE INVENTION

A typical air meter for measuring air intake into an internal combustion engine operates on the principle of hot-film anemometry. A heated element is placed within the airflow stream, and maintained at a constant temperature differential above the air temperature. The amount of electrical power required to maintain the heated element at the proper temperature is a direct function of the mass flow rate of the air past the element.

The measurement function of the typical mass air flow meter is performed using a bridge circuit, often referred to as a Wheatstone bridge, and shown as element 10 in FIG. 2. In this circuit, temperature-sensitive resistors are used as the ambient temperature sensor A1 and as the heated sensing element H1. Typical mass air flow measurement in an automotive environment employs a hot wire anemometer, with heated sensor H1 and ambient sensor A1. Both sensors have a high temperature coefficient of resistance. The heated sensor H1 is placed in the air flowstream, and as air flows across the heated sensor H1 heat is removed from the sensor in proportion to mass of air. Resistance of ambient sensor A1 changes with the temperature of the ambient air. The right side of the bridge, consisting of the ambient sensor A1 and calibration resistors ($R_S$ and $R_C$), establishes a voltage ($V_r$) at Node 3 which is based upon ambient temperature. The heated sensing element H1 on the left side of the bridge and the resistor $R_p$ have low resistances relative to the resistors on the right side of the bridge. Power dissipation due to a given voltage is inversely proportional to resistance (power=$V^2/R$), and therefore the low resistance elements H1, $R_p$ on the left side of the bridge dissipate enough electrical power to cause self-heating. The sensing elements are temperature-sensitive resistors and any change in temperature due to self-heating will result in a change in resistance of H1. This affects the voltage divider ratio on the left side of the bridge, and thus the voltage ($V_L$), measured at Node 2. The sensing bridge is balanced when the voltages ($V_L$ and $V_R$) are equal. A feedback amplifier 26 operates a FET transistor 30 to adjust electrical potential at Node 1 to maintain a balanced bridge voltage. Consequently, the desired operating temperature of the heated elements is maintained. The bridge voltage, which is the electrical potential at Node 1, is a measure of the heat dissipation at resistor H1, compensated by the ambient sensor A1, and is therefore proportional the mass of air flowing past the sensor.

In typical engine operation, especially with an engine having fewer than six cylinders, the airflow in the intake manifold experiences severe pulsations caused by engine dynamics related to opening and closing of intake valves and associated flow of air into each cylinder. There are areas of operation when airflow reverses, i.e., air flows out of the intake manifold away from the engine. A typical uni-directional air flow sensor is operable to measure magnitude of air flow, but not direction of the airflow. The inability to determine direction of airflow may result in introduction of significant errors in measure of mass air flow into the engine during conditions wherein reverse flow conditions occur.

One potential solution for this problem comprises mounting four sensing resistors on a thin (~2 micrometer thick) membrane, with a heater in the center of the membrane providing heat using the same bridge voltage as previously described. A constant temperature is maintained in the center of the membrane. Air flowing across the upstream side of the membrane is cooled while the downstream side experiences slight heating. When the sensors are arranged in a bridge circuit, both magnitude and direction of the flow can be measured by comparing the voltage of the two sides of the bridge. However the sensor output signal is extremely small (i.e. range of millivolts) and the corresponding signal-to-noise ratio is not large enough to allow reliable measurement. Furthermore, it is difficult to manufacture and process the sensor, including placement of the sensors in the middle of the membrane. Incorrect placement of sensors may result in a drift of the output signal over time. Most importantly, such a membrane has proven to be fragile, thus reducing reliability of the device, causing customer dissatisfaction and high warranty costs.

Another potential solution implemented includes attempts to mechanically block exposure of a sensing device to reverse flow conditions. This solution reduces error, but there still exists significant flow error.

Another potential solution for the aforementioned problem comprises developing a sophisticated filtering system to monitor signal input from a sensor, and identify reverse flow conditions. A sophisticated filtering system, comprising elements including second-order digital filters and other elements consume substantial amounts of execution time, microprocessor time and computer memory, and is not feasible for implementation in a low-cost microcontroller used primarily in an airflow sensing device.

Therefore, what is needed is a method and apparatus that employs the currently available uni-directional air meter design with additional circuitry and algorithms to effectively measure air flow during forward and reverse flow conditions to provide an accurate measure of net mass airflow.

SUMMARY OF THE INVENTION

The present invention provides an improvement over conventional air flow metering solutions by employing a currently available conventional, unidirectional air flow sensing element with circuitry and algorithms to process and filter a raw signal output from the airflow meter, extract information regarding magnitude and direction of airflow from the signal output, provide compensation for the signal output, and deliver an accurate measure of airflow, in this embodiment to an [internal combustion engine.

The present invention comprises a digital filter requiring minimal execution time and capable of handling pulse frequencies observed during pulsing flow conditions, filtering out high frequency noise, while still able to detect onset of reverse flow.

In accordance with the present invention, an airflow metering device, including an airflow sensing device signally connected to a signal processor is shown, having an input flow signal correlatable to a magnitude of mass air flowing past the airflow sensing device. The signal processor is operable to determine a flow correction factor based upon a direction and magnitude of the mass air flowing past the airflow sensing device. The output of the airflow metering device comprises the input flow signal of the airflow sensing device adjusted by the flow correction factor determined by the signal processor.

An aspect of the present invention comprises the airflow metering device wherein the signal processor operable to determine the flow correction factor comprises a microcontroller on-board the metering device including an algorithm operable to determine magnitude of reverse airflow based upon the input flow signal of the airflow sensing device.

A further aspect of the present invention comprises the airflow metering device wherein the embedded algorithm is operable to characterize the input flow signal of the airflow sensing device, determine a flow mode based upon the characterized input flow signal, and select the flow correction factor, based upon the determined flow mode and the characterized input flow signal.

A further aspect of the present invention comprises the determined flow mode comprising one of a non-pulse flow mode, a pulse flow mode, an onset of reverse flow mode and a reverse flow mode.

A further aspect of the present invention comprises the airflow metering device algorithm operable to determine the onset of reverse flow mode, which comprises detection of initial low levels of reverse airflow based upon a second derivative of the input flow signal of the airflow sensing device.

A further aspect of the present invention comprises the airflow metering device algorithm operable to characterize the input flow signal of the airflow sensing device, comprising the algorithm operable to calculate a first derivative of the input flow signal.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT

Figure 1:
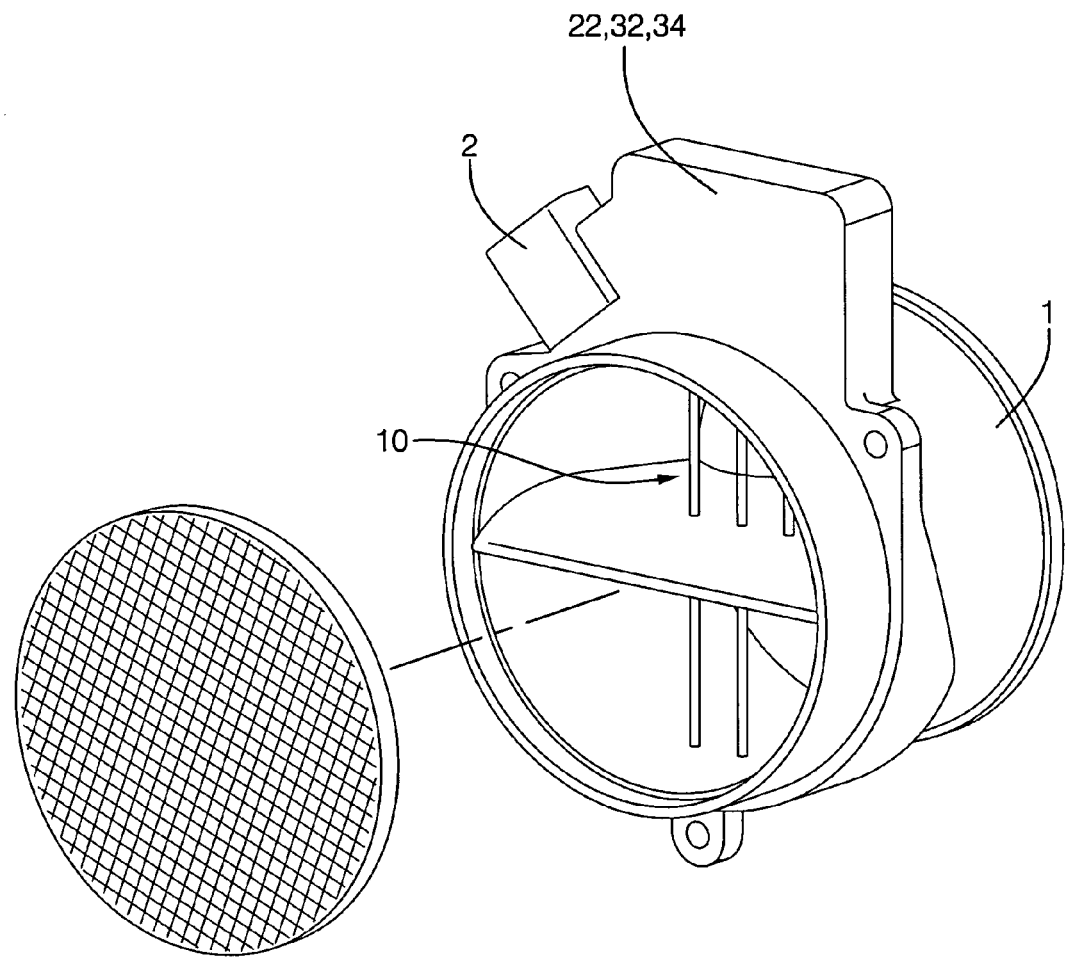
FIG. 1 is a schematic diagram of an air meter, in accordance with the present invention.

Referring now to the drawings, wherein the showings are for the purpose of illustrating the invention only and not for the purpose of limiting the same, FIG. 1 shows a mass airflow meter 1 which has been constructed in accordance with an embodiment of the present invention.

The mass airflow sensor 1 of this embodiment preferably comprises a conventional unidirectional sensor, and is an element of an air intake system, preferably located in an air flowstream between an air filter and an intake manifold of an internal combustion engine (not shown). The air intake system includes ducting leading from the air filter to the intake manifold, and is designed to ensure all air entering the intake manifold passes through the air filter and past the mass air flow sensor. The air intake system is typically located in an engine compartment when included on a vehicle. The exemplary mass airflow meter 1 comprises a conventional hot-film anemometric sensing device 10 operable to sense mass airflow in the air flowstream, an electrical connector 2, a microcontroller 32, a custom integrated circuit 22, and a flow correction circuit 34.

Figure 2:
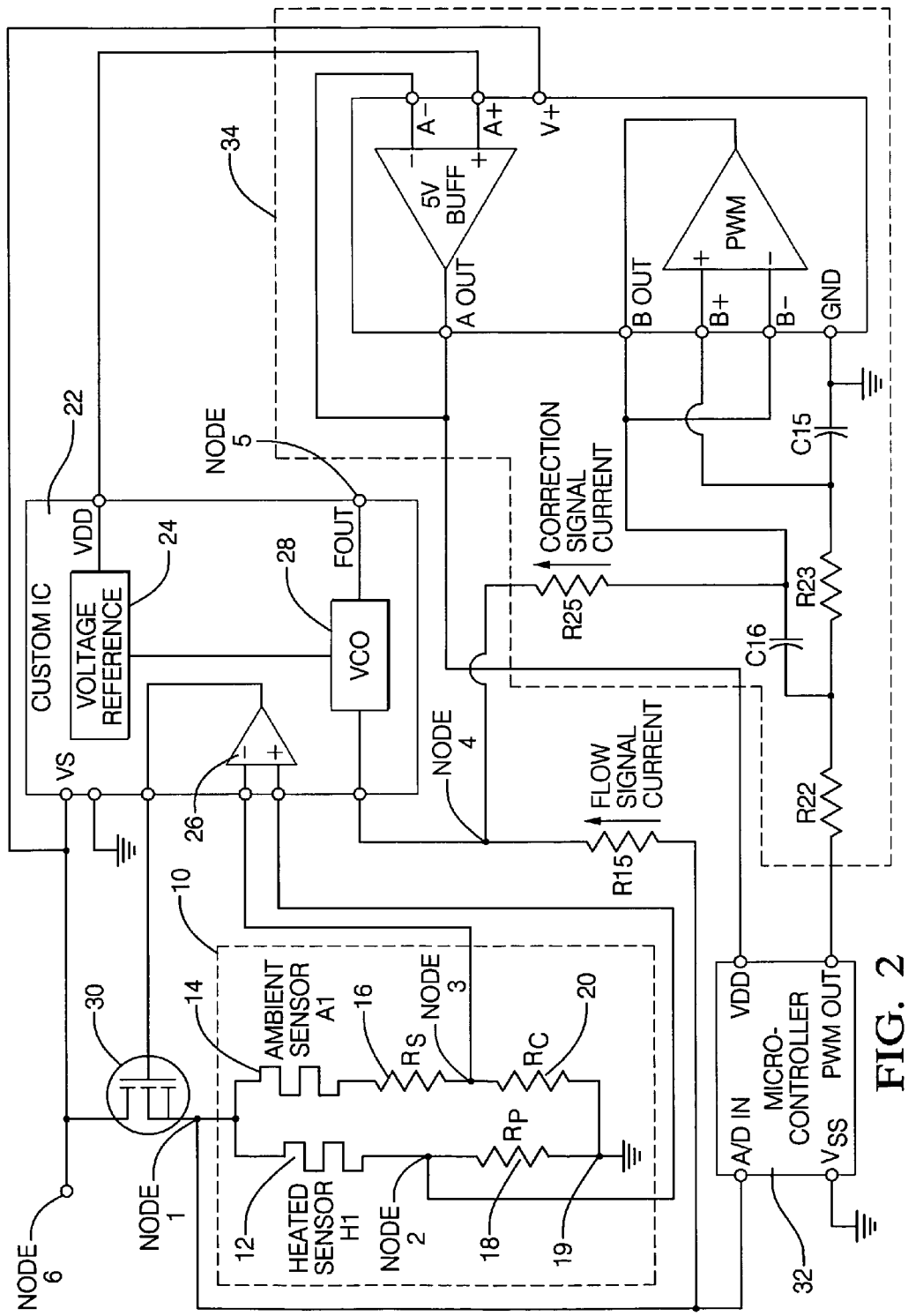
FIG. 2 is a schematic diagram of an electrical circuit, in accordance with the present invention.

Referring now to FIG. 2, the mass airflow meter 1 preferably includes the sensing device 10 with sensors 12, 14, custom integrated circuit 22, on-board microcontroller 32, and, flow correction circuit 34, each electrically interconnected, as described hereinafter. The mass airflow sensor 1 is preferably connected at connector 2 to an electronic engine controller (not shown) via a wiring harness (not shown). The wiring harness conducts electrical power from an ignition circuit, typically a 12 Volt DC supply, to the mass airflow meter 1 at Node 6, and conducts an electrical output from Node 5 to the electronic engine controller, typically in the form of a digital signal of variable frequency. The digital signal of variable frequency that is output from Node 5 correlates directly to mass of air flowing past the mass airflow meter 1. The measure of mass of airflow is used in this embodiment by the electronic engine controller as part of overall engine control, as is known to one skilled in the art, and not discussed in detail herein.

The sensing device 10 preferably comprises a hot film anemometer element 12, known to one skilled in the art. The sensing device is electrically connected at Node 1 with an ambient resistive element 14, and electrically connected at Nodes 2 and 3 into a bridge circuit with resistors 16, 18, 20, and leading to an electrical ground 19. Electrical potentials at Nodes 2 and 3 are input to a differential operational amplifier 26 of custom integrated circuit 22. Output of the differential operational amplifier 26 is electrically connected to a gate input of a FET transistor 30 to control electrical potential at Node 1, hence voltage to the hot film anemometer element 12 and the ambient resistive element 14. The ambient resistive element 14 is a variable resistive device that varies resistance based upon ambient air temperature. Therefore, the electrical potential at Node 3 varies based upon ambient air temperature.

The hot film anemometer element 12 and resistor 18 are preferably relatively lower in resistance than element 14 and resistors 16, 20. Electrical power dissipation is inversely proportional to resistance (power=$V^2/R$), leading to self-heating of hot film anemometer element 12 and resistor 18 when operated in the bridge circuit of sensing device 10. Hot film anemometer element 12 is made of material with a high temperature coefficient of resistance. As air passes over the hot film anemometer element 12, heat is dissipated in proportion to mass of airflow, without accounting for ambient temperature, and affecting electrical potential at Node 2. The operational amplifier 26 and FET 30 drive the electrical potential at Node 1, balancing the bridge circuit and causing electrical potentials at Node 2 and Node 3 to become equal. This provides an adjustment in the electrical potential at Node 2 for effects of ambient temperature, as determined by potential at Node 3. The electrical potential at Node 1 is therefore proportional to mass airflow passing over the sensing element 12. Bridge circuits and hot film anemometers, including selection of elements 12, 14, and properly sized resistors 16, 18, 20 are known to one skilled in the art. The potential at Node 1 is input to the microcontroller 32 for analysis, as is detailed hereinafter.

The electronic microcontroller 32 is electrically connected to receive the electrical signal from Node 1, and provides a pulsewidth-modulated ('PWM') electrical output, based on analysis of the input signal. The PWM output is converted to electrical current by electrical circuit 34, which is electrically summed at Node 4 with electrical current needed to correct a pulsing or reversing flow waveform at Node 1, such that average indicated flow at Node 5 is indicative of actual airflow to the engine. The summed electrical current at Node 4 is input to a voltage controlled oscillator 28 that is an element of integrated circuit 22, the output of which passes through Node 5 to the engine controller (not shown).

The electronic microcontroller 32 is preferably an off-the-shelf, low-cost microcontroller powered by a buffered 5 Volt DC power supply. The buffered 5 Volt DC power supply originates from the ignition circuit at Node 6, and passes through a voltage reference 24 that is an element of custom integrated circuit 22. The electronic microcontroller 32 has an on-board internal 10 bit analog-to-digital converter operable to sample the signal at Node 1. The electronic microcontroller 32 preferably includes an internal clock with a fixed clock frequency of 4 megahertz ('MHz'), driven by a 16 MHz external resonator (not shown), fixed memory of 8 kilobytes of programmable non-volatile memory (flash EEPROM), and 256 bytes of volatile or random access memory (RAM). The microcontroller 32 is in a small package to minimize space usage. The output of the microcontroller 32 is a correction signal, comprising a PWM output with 9-bit resolution that is converted to electrical current and summed at Node 4, as mentioned hereinabove. Signal conditioning algorithms are preferably programmed into the programmable non-volatile memory of the microcontroller 32 during manufacturing of the air meter 1, and are operable to execute during ongoing operation of the air meter 1. The electronic microcontroller 32 preferably executes the signal conditioning algorithms at least once every 500 microseconds, and updates the PWM output accordingly. The PWM output preferably operates at 8 kHz, in this embodiment.

The signal conditioning algorithms are operable to determine input flow modes, based upon the monitored voltage potential across the hot film anemometer. The monitored voltage potential across the hot film anemometer comprises raw data representing air flow output from Node 1 and analyzed by the microcontroller 32. The raw data representing air flow is characterized, preferably comprising determining a flow mode based upon the characterized input flow. The determined flow mode preferably consists of a no pulsing flow mode, a pulse flow mode, an onset of reverse flow mode and a reverse flow mode. Raw data output from Node 1, representing airflow, and exemplifying the no pulsing flow mode, pulse flow mode, onset of reverse flow mode and reverse flow mode are shown with reference to FIG. 7. An air flow correction factor is selected, based upon the determined flow mode and the characterized input flow. The output from Node 1, comprising the monitored voltage potential across the hot film anemometer, is corrected with the selected air flow correction factor, output from the microcontroller 32 and flow correction circuit 34, thus providing an accurate real-time measurement of mass air flow passing the mass airflow meter 1, and is preferably updated at least every 500 microseconds. This operation is hereinafter described in detail.

Figure 3:
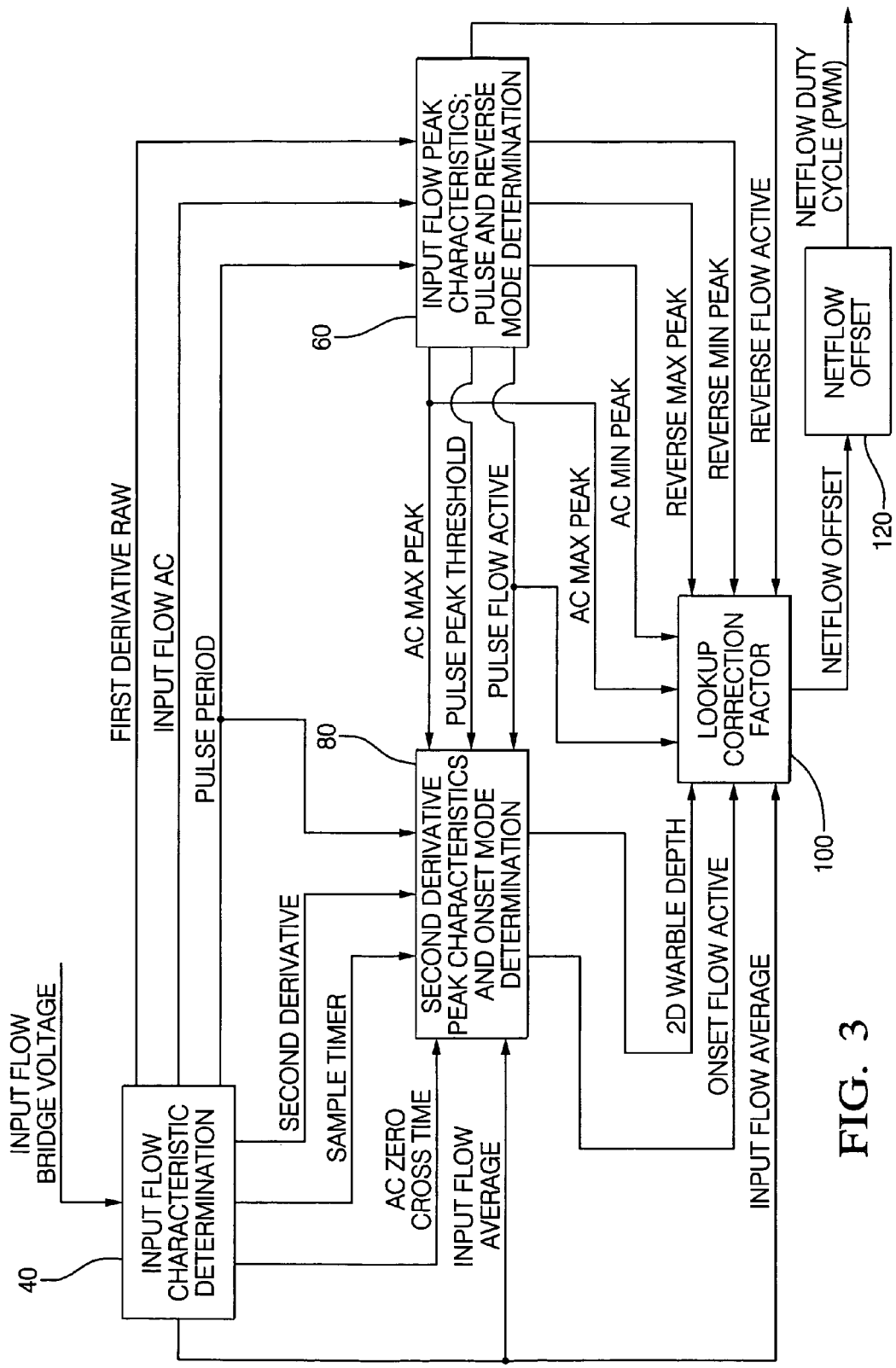
FIGS. 3–6 are algorithmic flowcharts, in accordance with the present invention; and, FIGS. 7–11 are representative data graphs, in accordance with the present invention.

Referring now to FIGS. 3–7, the signal conditioning algorithm in accordance with the invention is shown and described hereinafter. Referring now to FIG. 3 specifically, the signal conditioning algorithm is preferably executed in the electronic microcontroller 32, and comprises ongoingly monitoring the electrical potential input at Node 1, converting the input to a digital signal with the analog to digital converter, now referred to as the Input Flow Bridge Voltage. The algorithm generally comprises inputting the Input Flow Bridge Voltage into an Input Flow Characteristic Determination subroutine (block 40). Various outputs from Input Flow Characteristic Determination subroutine (block 40) are input to a Second Derivative Peak Characteristics and Onset Mode Determination subroutine (block 80), an Input Flow Peak Characteristics and Pulse and Reverse Mode Determination subroutine (block 60), and a Lookup Correction Factor subroutine (block 100), for further processing and analysis. The microcontroller 32 calculates a PWM electrical output signal correlatable to a determined correction factor. The PWM electrical output signal is converted into an electrical current by electrical circuit 34 and summed at Node 4 with electrical current that is proportional to the electrical potential input from Node 1. The summed electrical current at Node 4, representative of corrected, or compensated, mass air flow, is input to voltage-controlled oscillator 28 that is an element of integrated circuit 22. The output of the voltage-controlled oscillator 28 is preferably input from Node 5 through connector 2 and wiring harness to the engine controller, as previously described.

The Input Flow Characteristic Determination (block 40), Second Derivative Peak Characteristics and Onset Mode Determination (block 80), Input Flow Peak Characteristics; Pulse and Reverse Mode Determination (block 60), and Lookup Correction Factor (block 100) are detailed hereinafter.

Figure 4:
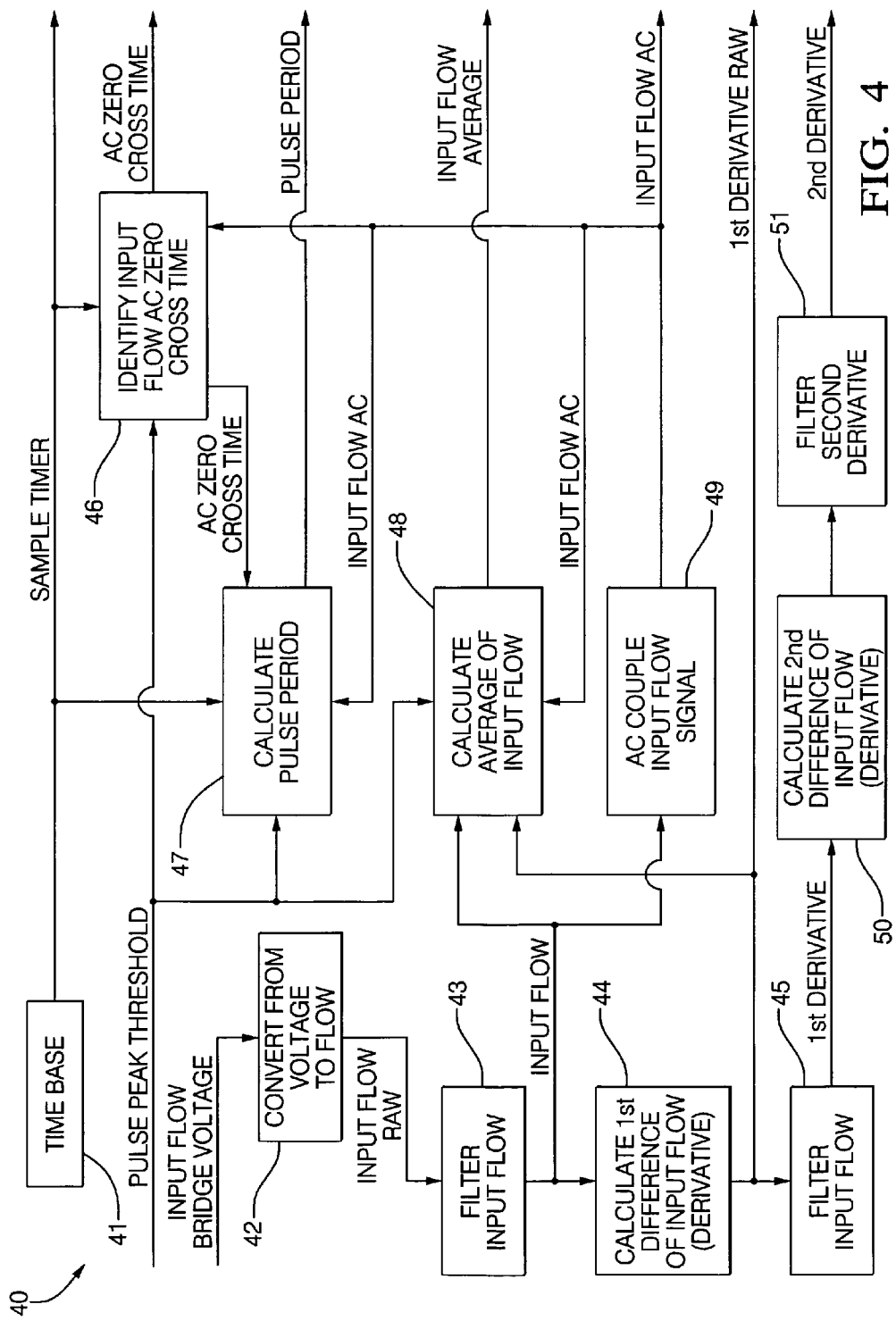

Referring now to FIG. 4, the Input Flow Characteristic Determination subroutine is described in detail. The Input Flow signal is analyzed, and flow is preferably divided into four modes, as described hereinabove and as shown with reference to FIG. 7. There is the No Pulsing Flow mode, meaning a steady state flow or low amplitude pulsing flow needing no compensation. This is a calibratable threshold, typically about 2 grams per second peak-to-peak, or +/−1 gram per second from zero to a minimum or maximum peak. There is the Pulse Flow mode, wherein the input flow pulse amplitude is sufficient to likely cause substantial error (i.e. greater than 1.0% measurement error) in the flow output signal of the airflow meter. The third mode is the Onset of Reverse Flow, also referred to as Onset, which indicates a reversing direction of air flow, causing a slight inflection in the pulsing waveform of the air flow signal, which is difficult to detect. There is the Reverse Flow mode, wherein the input airflow changes direction. The Input Flow signal is typically reasonably sinusoidal, with a valid frequency in the range of 16 to 250 Hz, corresponding to 480 to 7500 engine revolutions per minute when applied to a four-cylinder engine. A pulse frequency is determined, which correlates to the reasonably sinusoidal frequency of the input flow signal.

Referring again to FIG. 4, a time base (block 41) provides a sample timer output. The Input Flow Bridge Voltage is converted to raw input flow (block 42), and is subsequently filtered using a software algorithm (block 43), which preferably comprises a first-order low-pass filter with a variable cutoff frequency, preferably set at four times the pulse frequency. The filtered input flow is input to calculate a first derivative of the Filter Input Flow signal (block 44). Calculating the first derivative (block 44) comprises calculating a difference between measured input flow signal from immediately previous execution cycle and the currently measured input flow signal. The raw first derivative and the input flow are input with a pulse peak threshold and input flow AC to calculate an average of the input flow (block 48). The Filtered Input flow is input to AC-couple the input flow signal (block 49). The pulse frequency is calculated as an inverse of pulse period, determined with reference to block 47, with inputs from the sample timer, a pulse peak threshold signal, and an AC zero cross time signal, output from block 46. Output from the first derivative (block 44) is filtered (block 45), preferably employing a variable moving average filter with two to four previously measured input flow samples. The filtered first derivative is used as input to calculate a second derivative or difference of input flow (block 50). The second derivative, or difference, is determined by calculating a difference between previously determined first derivative and the currently calculated first derivative (block 50). This is subsequently used to identify inflection points of the input flow signal and indicate a flow mode. Output from the second derivative (block 50) is filtered (block 51), preferably employing a variable moving average filter with two to four previously calculated second derivative values. The pulse peak threshold is used with the sample timer and the input flow AC signal to identify input flow AC zero cross time signal (block 46). The input flow signal is AC-coupled to determine an Input Flow AC term (output from block 49). AC-coupling comprises employing a high-pass signal filter to extract a fixed offset, i.e. a DC voltage offset, from the Input Flow signal, leaving the frequency component of the Input Flow signal as the Input Flow AC term, to be used subsequently.

Figure 5:
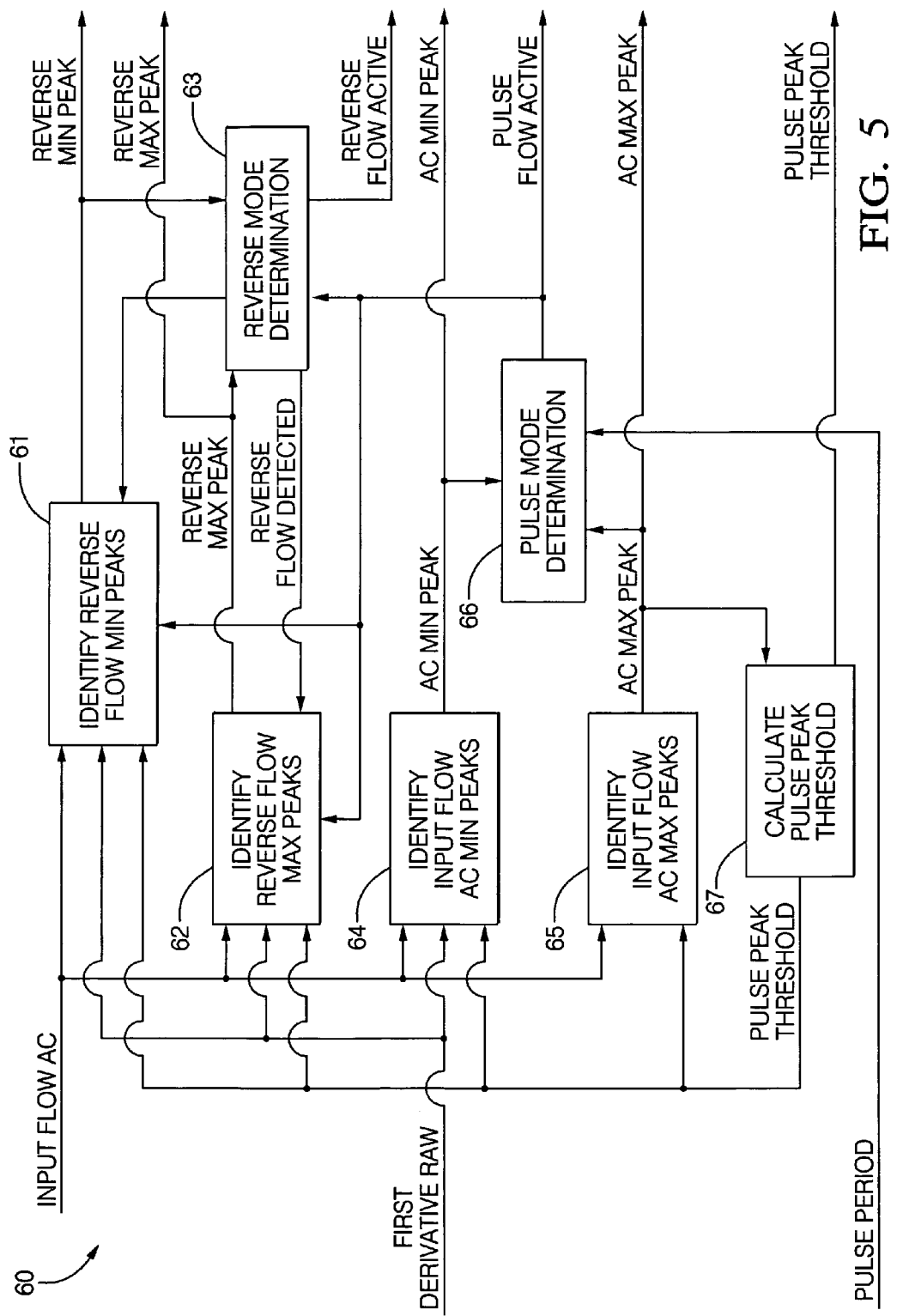

Referring now to FIG. 5, the subroutine for Determination of Input Flow Peak Characteristics and Determination of Pulse and Reverse Modes is described in detail (block 60). During algorithm execution, it is necessary to know the values of the peaks of the pulsing waveform, input as the Input Flow AC. Typically there is a maximum and minimum peak for each pulse. During obvious reverse flow (see FIG. 9), there are two minimums below zero on an AC-coupled waveform, and a maximum between those peaks. These peaks may be determined on either the Normal Input Flow waveform, or an AC-coupled Flow waveform, depending on its usage. There are three methods to be considered for detecting peaks of the waveform. A first method comprises taking a first derivative of the waveform. A positive-to-negative or negative-to-positive crossing of the first derivative is an indication that a peak has been reached, and is useful to identify each peak without additional filtering.

A second method comprises use of an N-deep stack to find the peak, which seeks a maximum or minimum value to be centered in stack of data. The 'N' is typically an odd positive integer. The larger the number, the more noise that is filtered, but increasing a potential risk of omitting certain valid low amplitude occurrences of minimum and maximum values. This method is effective when adding another derivative, wherein a filter is costly in terms of memory usage and throughput. A third method comprises a peak follower, wherein a maximum value of the waveform is tracked, until a reset condition occurs, e.g. a zero crossing. This method is useful when seeking to find a maximum value only.

Identifying a first Reverse Minimum Peak (block 61) comprises monitoring Input Flow AC, the Raw First Derivative of the Input Flow, a Pulse Peak Threshold (from block 67), Pulse Flow Active flag set (block 66), and Reverse Flow Detected flag set (Block 63. This detects a First Minimum Peak occurring after the AC-coupled input flow goes below zero. The value and location in time of the First Minimum Peak is important because it is the first indicator that obvious reverse flow is occurring. When the First Minimum Peak occurs with a subsequent Reverse Maximum Peak, then it is called the First Reverse Minimum Peak. A straightforward way to identify the first minimum peak is to identify a negative-to-positive change in the First Derivative waveform (from block 44). This value is used to verify reverse flow validity when a Reverse Maximum Peak subsequently occurs. If the minimum peak occurs without a corresponding Reverse Maximum Peak, then reverse flow flag is not set (i.e. output from Block 63 is low) and is called a Normal Minimum Peak. An onset mode or pulse flow mode may be active when a normal peak is observed.

Identifying a Reverse Maximum Peak (block 62) comprises monitoring Input Flow AC, the Raw First Derivative of the Input Flow, Pulse Peak Threshold (from block 67), Pulse Flow Active flag set (block 63), and Reverse Flow Detected flag set, to detect when reverse flow occurs in the airflow. The Reverse Maximum Peak is detected using positive-to-negative transition of the First Derivative after the First Normal Minimum Peak has been detected. When the Reverse Maximum Peak is below the Pulse Peak Threshold, it is considered a valid Reverse Maximum Peak, and the previous minimum flow is a Reverse Minimum.

Identifying Input Flow AC Maximum Peak (block 65) comprises monitoring Input Flow AC and Pulse Peak Threshold to determine a maximum value, and storing it for subsequent use. The output comprises an AC Maximum Peak term, which is used to Calculate Pulse Peak Threshold (block 67), which is typically about 45% of the previous AC-coupled Maximum Peak. The AC Maximum Peak term is used as an input to Pulse Mode Determination (Block 66) in conjunction with inputs from AC Minimum Peak and Pulse Period. Output of Pulse Mode Determination (Block 66) comprises a flag indicating Pulse Flow Active, i.e. the input flow pulse amplitude is sufficient to cause error in the flow output measurement, as previously described. Real-world vehicle data taken has shown multiple peaks on the positive side (i.e., the portion above the average flow) of the input flow during pulse flow conditions. In such conditions, it is preferable to select the highest value peak. Peak detection therefore uses peak follower detection (i.e. checking every point), or the first derivative (i.e. checking only when each new peak is detected). Each successive maximum peak is checked and the maximum peak value is saved, or alternately, the most recent maximum peak value is saved.

Identifying Input Flow AC Minimum Peak (block 64) comprises monitoring Input Flow AC, the First Derivative Raw value, and Pulse Peak Threshold value. The Input Flow AC Minimum Peak is identified as the last minimum peak occurring prior to the Input Flow AC going greater than Pulse Peak Threshold (See, FIG. 9, Second Reverse Minimum Peak). This value is only used during pulsing flow and non-reversing flow conditions.

Determination of Reverse Mode (block 63) comprises monitoring the Reverse Minimum Peak, the Reverse Maximum Peak, and presence of Pulse Flow Active flag, to identify when reverse flow is detected, and when reverse flow is active. This mode includes two different flags. The first flag, 'Reverse Detected', is a set/reset latch with reset priority. The latch is set when the AC coupled flow value is below the Pulse Peak Threshold, the difference between the Reverse Max peak and the Reverse Minimum Peak exceeds the Reverse Flow Start Threshold, and Onset mode is active.

The latch is reset when the AC coupled flow value transitions from below the Pulse Peak Threshold to above the Pulse Peak Threshold. If none of the above conditions are present, the latch maintains its previous value. This flag does a pulse-by-pulse test for reverse mode, resetting once each pulse cycle. This allows the mode flags to be cleared quickly when reverse conditions are no longer present. The Reverse mode is detected part way through the first reverse cycle, after proper conditions (a minimum peak followed by another maximum peak within a short time) for reverse flow are confirmed, i.e. both the minimum and maximum peaks are verified.

The second reverse mode flag, referred to as Reverse Flow Active, is set when Reverse Flow Detected flag is set, i.e. reverse conditions have been validated. The latch is reset when the AC coupled flow value transitions from below the Pulse Peak Threshold to above the Pulse Peak Threshold, and the difference between the Reverse Maximum Peak and the Reverse Minimum Peak is less than Reverse Flow End Threshold. This adds hysteresis, thus minimizing reverse flow flag oscillation on and off during marginal reverse conditions. The reverse flow detected latch is reset causing the Reverse Active latch to reset one cycle after reverse mode has become inactive. The one cycle delay is a result of need for confirmation of proper reverse flow conditions (a minimum peak followed by another maximum peak within a short time), comprising the first minimum peak occurs and the subsequent reverse maximum peak does not occur within a predetermined time thereafter. In summary of the flow characteristics, there is the Normal Maximum Peak which uses peak follower detection on the AC-coupled waveform. The absolute value of the Normal Maximum Peak above zero is important for pulse flow determination. The Last Minimum Peak uses the first derivative detection on the AC-coupled waveform. The absolute value of the Normal Maximum Peak below zero is used during negative pulsing flow, for Pulsing Mode Detection. The First Reverse Minimum Peak uses the first derivative detection on the AC-coupled waveform. The differential value relative to the reverse maximum peak is used for Reverse Mode Detection. The Reverse Maximum Peak uses the first derivative detection on the AC-coupled waveform. The differential value relative to the first reverse minimum peak is used for Reverse Mode Detection.

Figure 6:
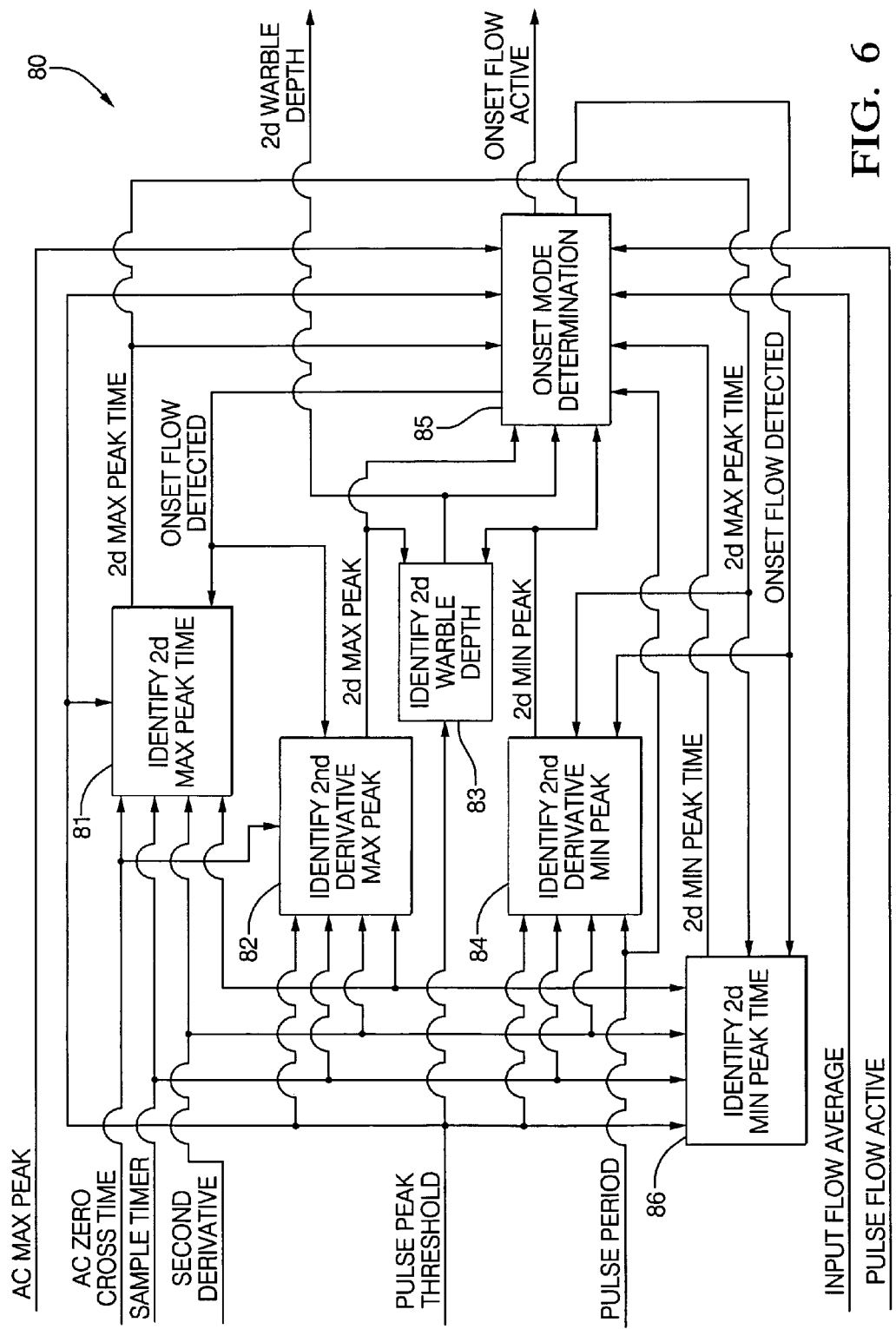
Figure 8:
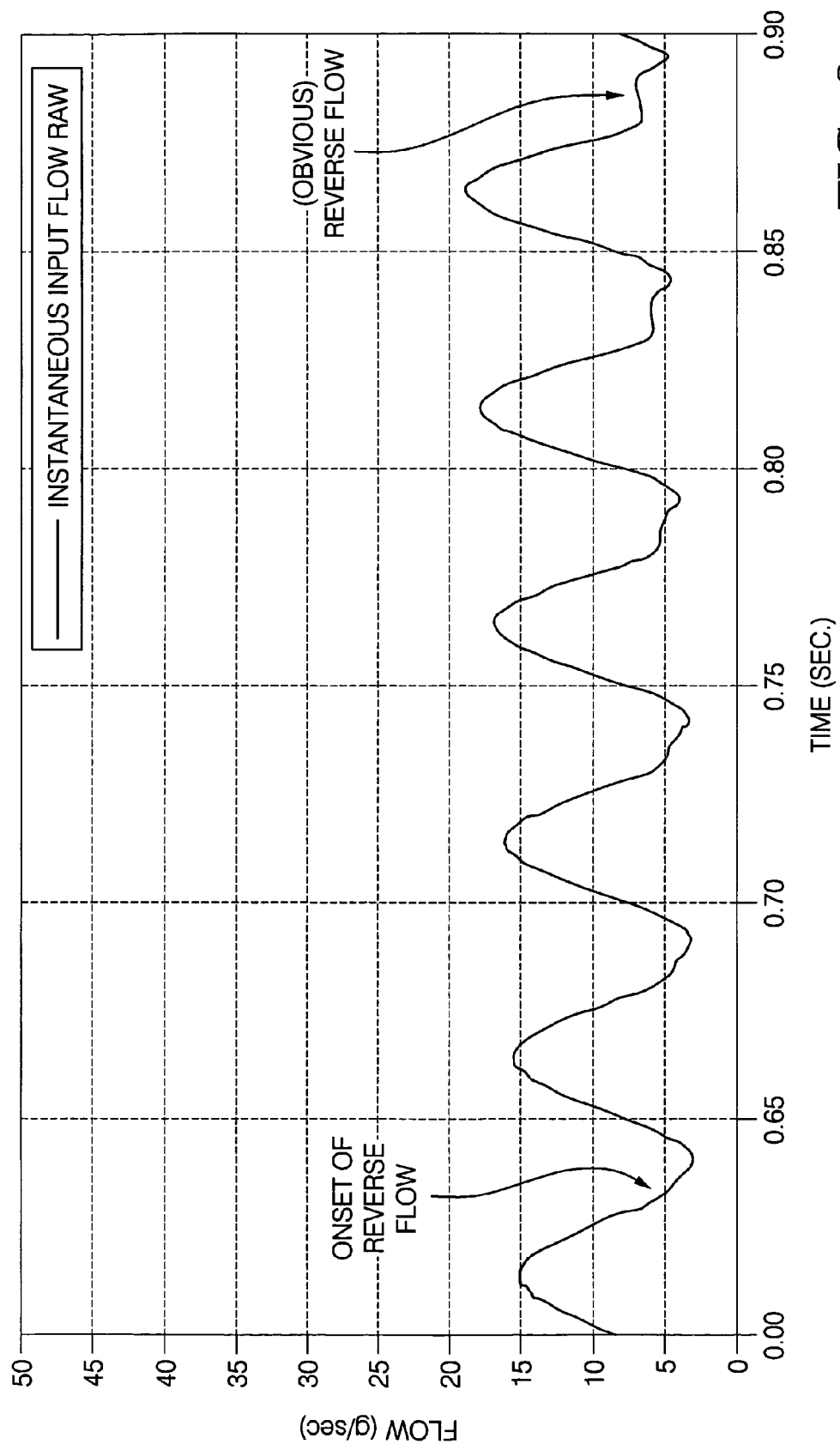
Figure 9:
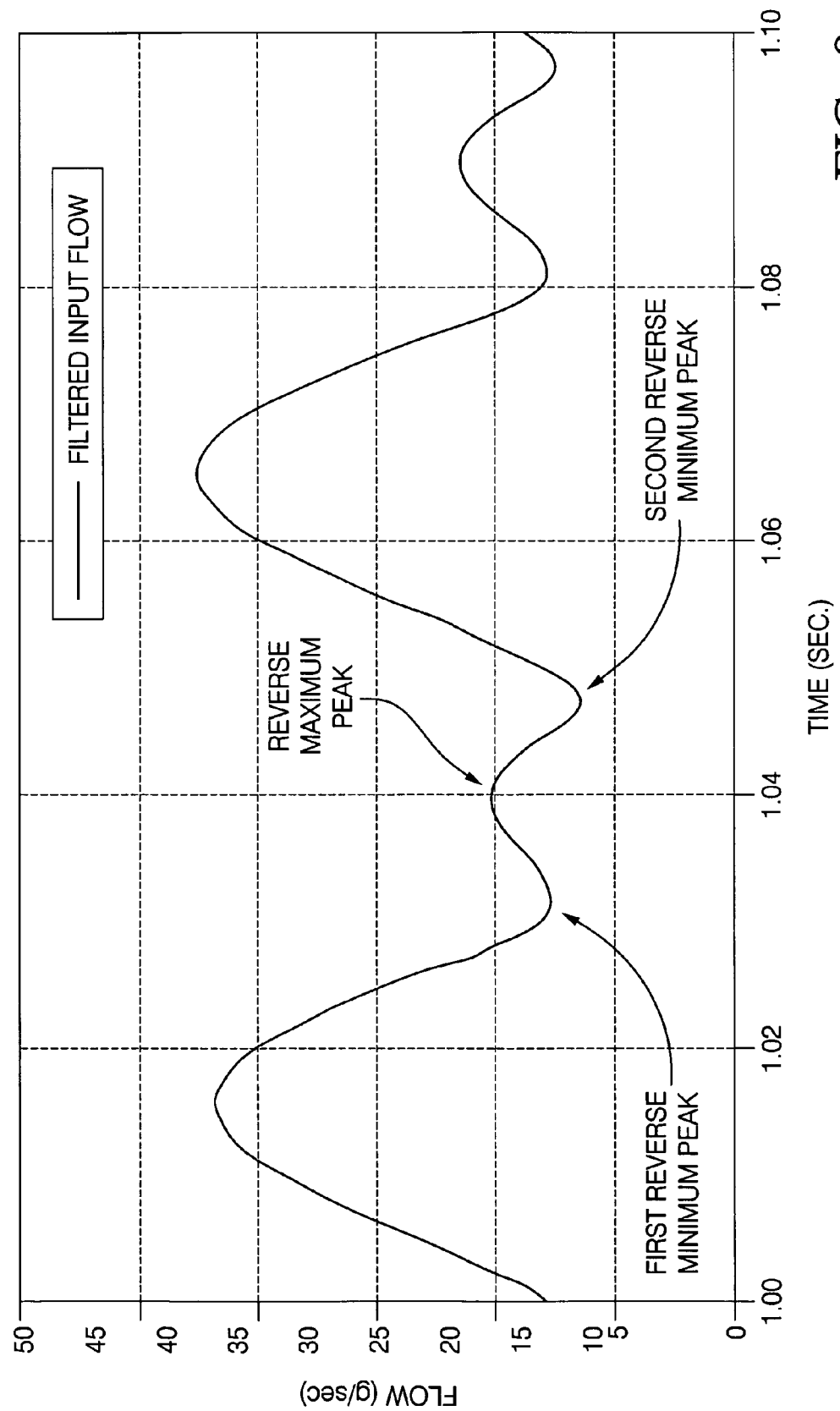

Referring now to FIG. 6, the subroutine for Determination of Second Derivative Peak Characteristics and Determination of Onset of Reverse flow modes is described in detail (block 80). Referring to FIG. 8, an exemplary data graph comprising raw input flow data with onset of reverse flow and reverse identified, is shown. Referring now to FIG. 9, an exemplary data graph comprising filtered input flow data with first and second reverse minimum peaks and reverse maximum peak is shown. Analysis of the second derivative waveform indicates that when a normally 'sinusoidal' waveform makes an extra inflection when it is above zero, it is an indication of reverse flow. The wave shape of the second derivative is analyzed to detect reverse flow. In the case where reversion is not directly detectable in the input flow waveform, it is identified as Onset flow mode and the onset flow flag is set. The onset flow is defined as onset of reverse flow.

Figure 10:
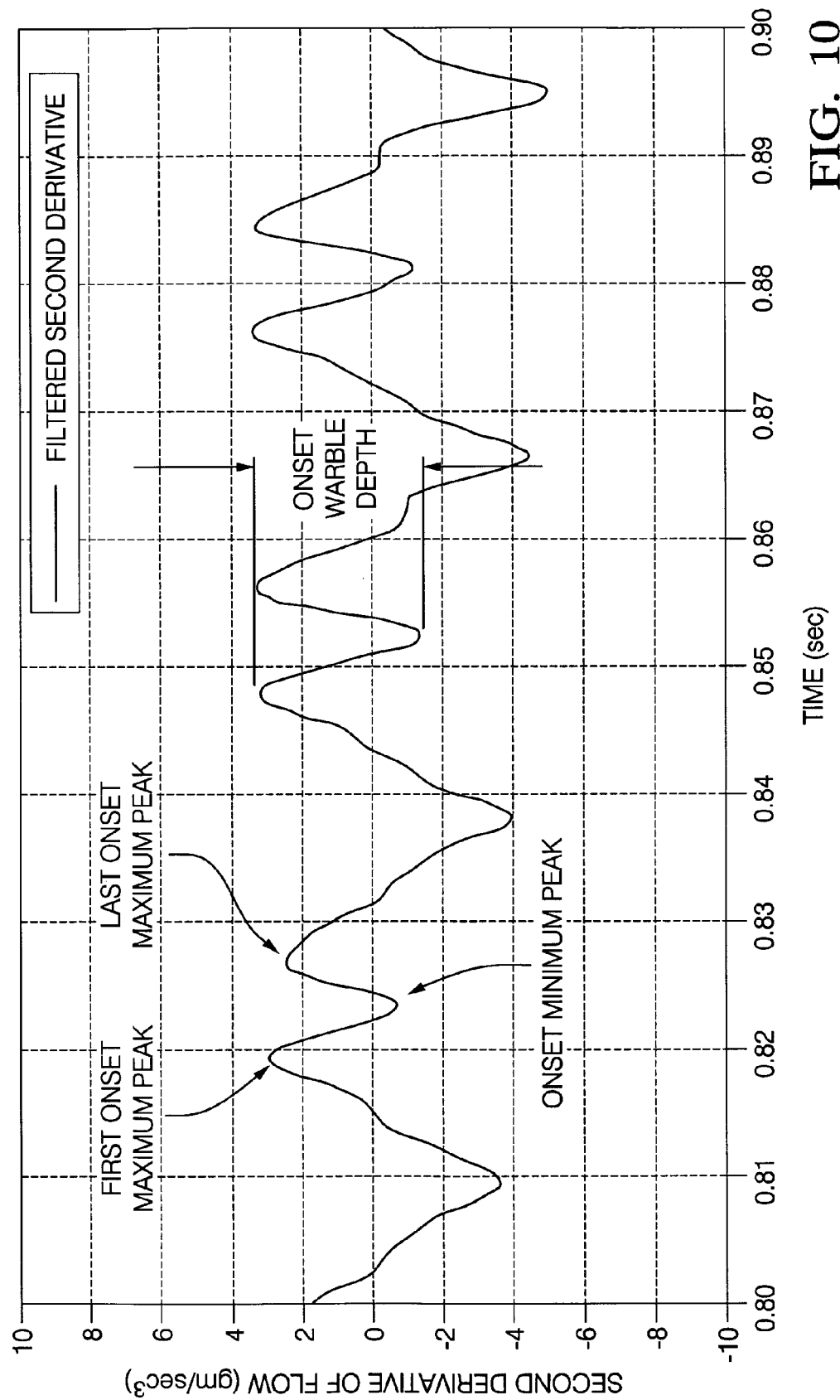

Referring now to FIG. 10, an exemplary data graph comprising the filtered second derivative of the flow is shown, and includes first onset maximum peak, onset minimum peak, last onset maximum peak, and onset warble depth. The first onset maximum peak of the second derivative waveform is where onset flow begins. The flow is at its greatest value of reversion when the second derivative reaches the next onset minimum peak. The second derivative waveform then goes to another or last onset maximum peak, which indicates the end of onset flow. Max Peak of the Second Derivative is identified by monitoring the sample timer, Pulse Peak Threshold, Pulse Period, AC Zero Cross Time, the Second Derivative, and Onset Flow Detection (block 82).

An N-deep stack is preferably used to detect minimums and maximums of the second derivative. To determine a maximum value, the N-deep stack evaluates the last three or four samples of the second derivative and looks for the center, or second, sample to be greater than the two or three adjacent samples. This method is also used to detect peaks on the second derivative waveform which indicate onset flow is occurring. The value of the second maximum peak of the second derivative is output to Onset Mode Determination (block 85).

Time of occurrence of the second maximum peak of the second derivative is similarly determined (block 81), based upon input of the pulse peak threshold, AC zero cross time, sample timer, pulse period, and the second derivative. The time of occurrence of the second maximum peak of the second derivative is output to Onset Mode Determination (block 85), and segments of the algorithm identifying the second derivative minimum peak magnitude (block 84) and peak time (block 86).

The minimum peak of the Second Derivative is identified by monitoring the sample timer, Pulse Peak Threshold, Pulse Period, the Second Derivative, the second maximum peak time, and Onset Flow Detection (block 84). A second N-deep stack is preferably used to detect a minimum value of the second derivative. To determine a minimum value, the N-deep stack evaluates the last three or four samples of the second derivative and looks for the center, or second, sample to be less than the two or three adjacent samples. This method is also used to detect peaks on the second derivative waveform which indicate onset flow is occurring. The value of the second minimum peak of the second derivative is output to Onset Mode Determination (block 85), and to identify a second warble depth (block 83). Time of occurrence of the second minimum peak of the second derivative is similarly determined (block 86), based upon input of the pulse peak threshold, sample timer, pulse period, second maximum peak timer, Onset flow detection, and the second derivative. The time of occurrence of the second minimum peak of the second derivative is output to Onset Mode Determination (block 85).

Second derivative onset warble depth, shown with reference to FIG. 10, is determined (block 83), using inputs from the second maximum peak, the second minimum peak, and the pulse peak threshold. This comprises a determination of transition from maximum peak input flow to minimum peak input flow to maximum peak input flow, and is calculated as a difference between the second derivative maximum peak and the second derivative minimum peak.

Onset of reversion mode determination (block 85) comprises monitoring inputs of the second maximum peak and the second maximum peak time; the second minimum peak and the second minimum peak time; input flow average, pulse period, pulse flow active flag, AC maximum peak, pulse peak threshold, and second warble depth. Onset of reversion mode (block 85) is operable to detect initial low levels of reverse flow, using information from the second derivative of input flow. This mode is difficult to detect because it is only observable when the second derivative is calculated, such as when the Input flow signal is noisy.

Determination of Onset flow occurs in two steps. The first step evaluates pulse peaks for occurrence in the Onset Flow Window, indicating the pulsewidth meets minimum and maximum duty cycle criteria, that a minimum pulse ratio, calculated as Max Pulse Peak divided by Input Flow Average, is met, and that the warble depth meets a minimum requirement, which varies as a predetermined percentage of Pulse Max Peak value. If all these conditions are met, the Onset Flow detected flag is set to indicate that it is possible that Onset flow is occurring. This flag is reset and re-evaluated each pulse cycle.

The second Onset Flow flag is a latch that indicates that onset flow is active. If the Onset Flow Detected Flag is set, the minimum peak is within the Onset Overflow window, and the second derivative warble depth exceeds a second (higher than the first) threshold, then the Onset Flow Active is set. To de-activate the Onset Flow Active flag, Onset flow must not be detected at the time the Onset Flow Active flag is re-evaluated (once each pulse cycle).

The air flow correction factor, indicative of mass of air flowing away from the intake manifold, is selected in Lookup Correction Factor (block 100), based upon the input flow average, the AC Minimum peak value, the AC maximum peak value, the reverse minimum peak value, the reverse maximum peak value, when the reverse flow active flag, the pulse flow active flag, or the onset flow active flag is set.

Figure 7:
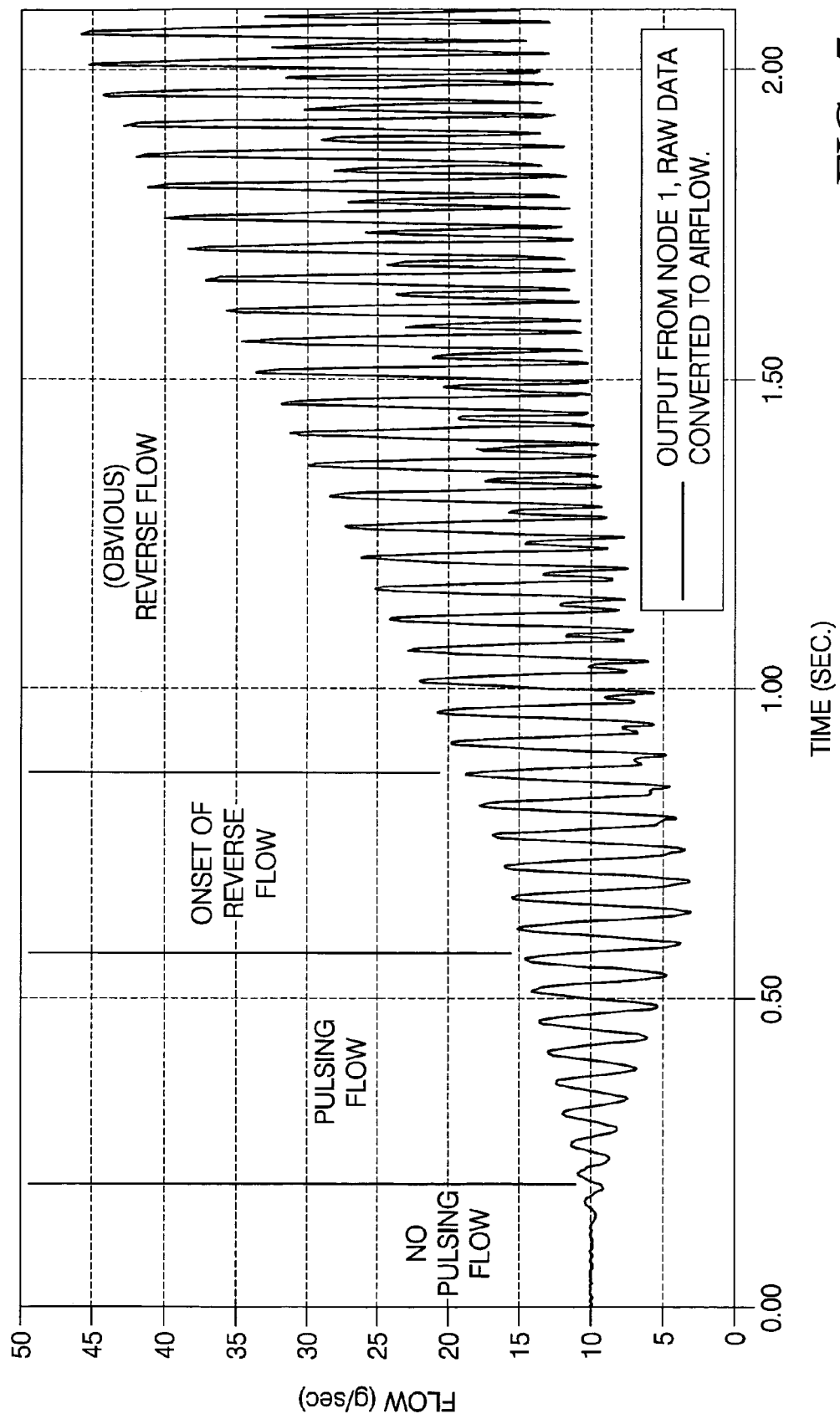

Three lookup tables are established in the microcontroller corresponding to the three airflow pulsing flow modes of pulse flow, onset flow, and reverse flow, also shown in FIG. 7. When Pulse flow is active, as indicated by the pulse flow active flag while Onset and Reverse are not active, the flow correction factor is selected from the Pulse Offset table (not shown), or an equivalent equation. If Onset Flow is active, but Reverse Flow is not, the compensation is selected from the Onset Flow table (not shown). If Reverse Flow is Active, the compensation is selected from the Reverse Flow table (not shown).

Calibration of the lookup tables comprises simulating the algorithm using pulsing flow speaker tests with known steady state flow values, and determining a target correction factor. The target correction factor used in determining the compensation table or equation is the difference between the actual measured flow, and the average flow of the input flow waveform. Calibration as such is known to one skilled in the art. The flow correction factor comprising the Pulse flow offset value is primarily a function of the AC Max Peak value, or pulse amplitude. The compensation table is preferably primarily based on this value, but could also change somewhat as a function of Input Flow average or Pulse Period. The flow correction factor comprising the Onset flow offset value is primarily a function of the second derivative warble depth. The compensation table is preferably primarily based on this value, but could also change somewhat as a function of AC Max Peak, Input Flow average, or Pulse Period. The flow correction factor comprising the Reverse flow offset value is primarily based upon the Reverse Flow warble depth. The table or equation is preferably primarily based on this value, but could also change somewhat as a function of AC Max Peak, Input Flow average, or Pulse Period. The flow correction factor is output to flow correction circuit 34 using an 8 kHz PWM signal, with 9-bit accuracy.

Figure 11:
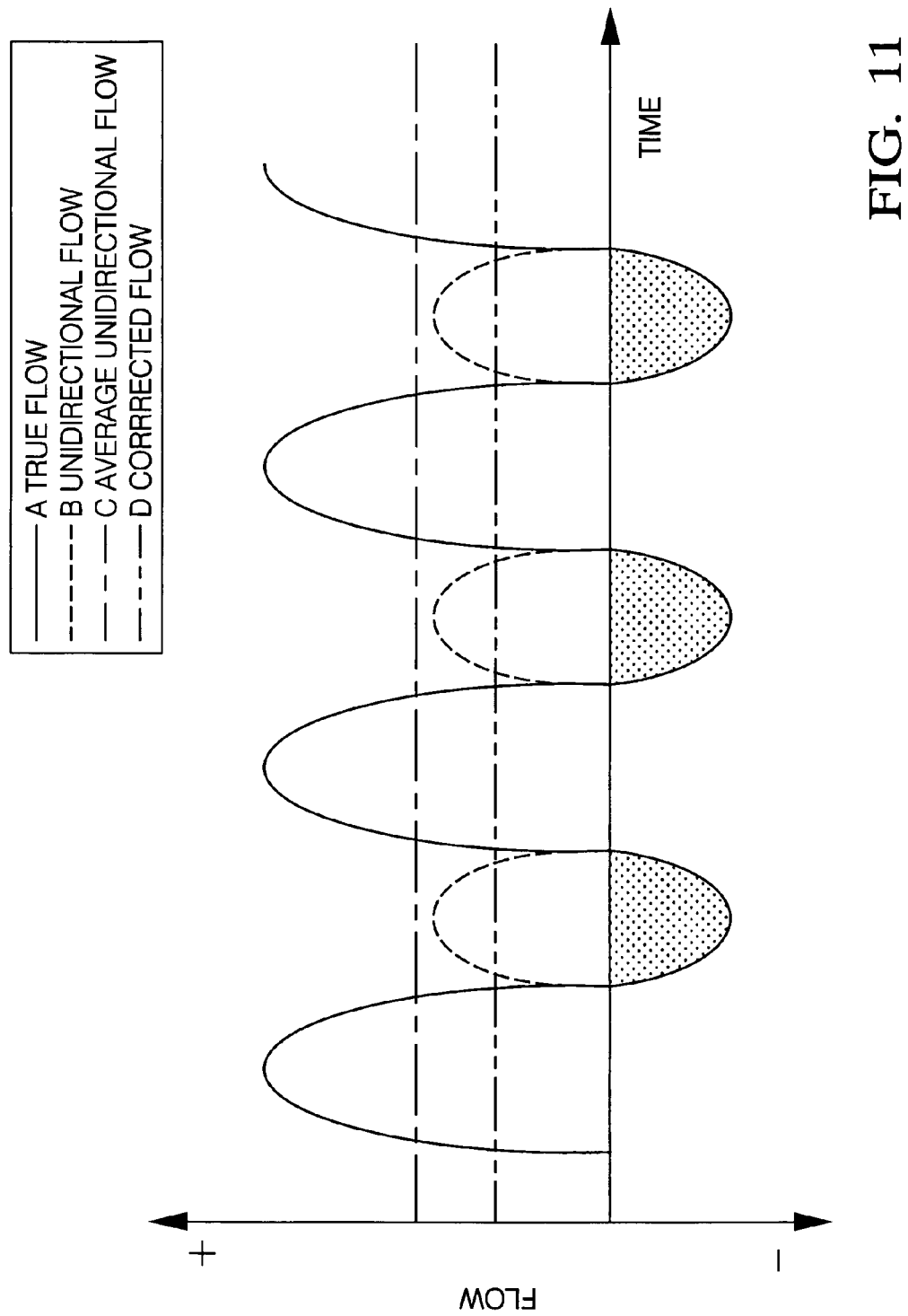

Referring now to FIG. 11, a representative data graph showing exemplary data is show. Data Line A exemplifies true airflow, shown as a sinusoidal graph. Data Line B exemplifies output from a prior art unidirectional air meter, wherein magnitude of flow is measurable, but direction of flow is unknown. Data Line C shows an average (or root-mean squared) measure of the unidirectional flow taken from Data Line B. Data Line D shows an average measure of Data Line A, and is the true flow average, employing the invention described hereinabove.

The invention has been described with specific reference to the embodiments and modifications thereto. Further modifications and alterations may occur to others upon reading and understanding the specification. It is intended to include all such modifications and alterations insofar as they come within the scope of the invention. It is especially understood that although this invention describes an embodiment executed for application on an internal combustion engine, the invention is applicable to a multitude of systems wherein accurate measurement of air flow is desired.

The invention claimed is:

1. An airflow metering device, comprising:
a unidirectional airflow sensing device:
signally connected to a signal processor, and
having an input flow signal correlatable to a magnitude of mass air flowing past the airflow sensing device; and
the signal processor;
operable to determine a flow correction factor based upon a direction and the magnitude of the mass air flowing past the airflow sensing device; and
the airflow metering device having an electrical signal output comprising the input flow signal of the airflow sensing device adjusted by the flow correction factor determined by the signal processor;
wherein the signal Processor operable to determine the flow correction factor based upon direction and magnitude of the mass air flowing past the airflow sensing device comprises: an on-board microcontroller including an algorithm operable to determine magnitude of reverse airflow based upon the input flow signal of the airflow sensing device; and
wherein the algorithm operable to determine magnitude of reverse airflow based upon the input flow signal of the airflow sensing device comprises: an algorithm operable to:
characterize the input flow signal of the airflow sensing device;
determine a no pulsing flow mode, a pulse flow mode, an onset of reverse flow mode, or a reverse flow mode based upon the characterized input flow signal; and,
select the flow correction factor, based upon the selected flow mode and the characterized input flow signal.

2. The airflow metering device of claim 1, wherein determination of the no pulsing flow mode comprises a determination of amplitude of the characterized input flow signal varying less than a predetermined flowrate.

3. The airflow metering device of claim 1, wherein the algorithm operable to characterize the input flow signal of the airflow sensing device comprises the algorithm operable to calculate a first derivative of the input flow signal.

4. The airflow metering device of claim 3, wherein the algorithm operable to characterize the input flow signal of the airflow sensing device comprises the algorithm operable to calculate reverse minimum peak flow value based upon the first derivative of the input flow signal.

5. The airflow metering device of claim 4, wherein the algorithm operable to characterize the input flow signal of the airflow sensing device comprises the algorithm operable to calculate reverse maximum peak flow value based upon the first derivative of the input flow signal.

6. An airflow metering device, comprising
a unidirectional airflow sensing device;
signally connected to a signal processor, and,
having an input flow signal correlatable to a magnitude of mass air flowing past the airflow sensing device; and
the signal processor:

operable to determine a flow correction factor based upon a direction and the magnitude of the mass air flowing past the airflow sensing device; and the airflow metering device having an electrical signal output comprising the input flow signal of the airflow sensing device adjusted by the flow correction factor determined by the signal processor;

wherein the signal processor operable to determine the flow correction factor based upon direction and magnitude of the mass air flowing past the airflow sensing device comprises; an on-board microcontroller including an algorithm operable to determine magnitude of reverse airflow based upon the input flow signal of the airflow sensing device;

wherein the algorithm operable to determine magnitude of reverse airflow based upon the input flow signal of the airflow sensing device comprises: an algorithm operable to:

characterize the input flow signal of the airflow sensing device, determine a flow mode based upon the characterized input flow signal, said determined flow mode comprising one of: a no pulsing flow mode, a pulse flow mode, an onset of reverse flow mode and a reverse flow mode, and select the flow correction factor, based upon the selected flow mode and the characterized input flow signal; and wherein determination of the onset of reverse flow mode comprises detection of an initial low level of reverse airflow based upon a second derivative of the input flow signal of the airflow sensing device.

7. The airflow metering device of claim 6, wherein the airflow sensing device comprises a hot-film anemometer operably electrically and signally connected to a resistive bridge device.

8. The air flow metering device of claim 7, wherein the air flow metering device is operable to meter airflow into an air intake system of an internal combustion engine.

9. The airflow metering device of claim 6, wherein the signal processor operable to determine the flow correction factor based upon direction and magnitude of the mass air flowing past the airflow sensing device comprises: a custom integrated circuit operable to determine magnitude of reverse airflow based upon the input flow signal of the airflow sensing device.

10. The airflow metering device of claim 6, wherein the signal processor operable to determine the flow correction factor based upon direction and magnitude of the mass air flowing past the airflow sensing device comprises: an algorithm up-integrated into an electronic controller, and operable to determine magnitude of reverse airflow based upon the input flow signal of the airflow sensing device;

said output of the airflow metering device comprising the input flow signal of the airflow sensing device adjusted by the flow correction factor determined by the algorithm up-integrated into the electronic controller.

11. An airflow metering device, comprising:

a unidirectional airflow sensing device;

signally connected to a signal processor, and, having an input flow signal correlatable to a magnitude of mass air flowing past the airflow sensing device; and the signal processor:

operable to determine a flow correction factor based upon a direction and the magnitude of the mass air flowing past the airflow sensing device; and the airflow metering device having an electrical signal output comprising the input flow signal of the airflow sensing device adjusted by the flow correction factor determined by the signal processor;

wherein the signal processor operable to determine the flow correction factor based upon direction and magnitude of the mass air flowing past the airflow sensing device comprises:

an on-board microcontroller including an algorithm operable to determine magnitude of reverse airflow based upon the input flow signal of the airflow sensing device;

wherein the algorithm operable to determine magnitude of reverse airflow based upon the input flow signal of the airflow sensing device comprises; an algorithm operable to:

characterize the input flow signal of the airflow sensing device, determine a flow mode based upon the characterized input flow signal, said determined flow mode comprising one of: a no pulsing flow mode, a pulse flow mode, an onset of reverse flow mode and a reverse flow mode, and select the flow correction factor, based upon the selected flow mode and the characterized input flow signal; and wherein the algorithm operable to characterize the input flow signal of the airflow sensing device comprises the algorithm further operable to calculate a second derivative of the input flow signal.

12. A method to meter net mass airflow, comprising:

determining an input flow signal correlatable to a magnitude of mass air flowing past a unidirectional airflow sensing device;

determining a magnitude of reverse airflow based upon the determined input flow signal;

selecting a flow correction factor based upon a direction and the magnitude of the revere airflow;

adjusting the determined input flow signal of the airflow sensing device with the selected flow correction factor; and determining signal output comprising the magnitude of mass air flowing past the unidirectional airflow sensing device to be the determined input flow signal of the airflow sensing device adjusted with the selected flow correction factor;

wherein determining the magnitude of reverse airflow based upon the determined input flow signal comprises:

characterizing the input flow signal of the airflow sensing device;

determining a no pulsing flow mode, a pulse flow mode, an onset of reverse flow mode, or a reverse flow mode based upon the characterized input flow signal; and, selecting the flow correction factor, based upon the determined flow mode and the characterized input flow signal.

13. The method of claim 12, wherein selecting the no pulsing flow mode comprises determining amplitude of the characterized input flow signal varies less than a predetermined flowrate.

14. The method of claim 12, wherein characterizing the input flow signal of the airflow sensing device comprises calculating a first derivative of the input flow signal.

15. A method to meter net mass airflow, comprising:

determining an input flow signal correlatable to a magnitude of mass air flowing past a unidirectional airflow sensing device;

determining a magnitude of reverse airflow based upon the determined input flow signal;

selecting a flow correction factor based upon a direction and the magnitude of the revere airflow;

adjusting the determined input flow signal of the airflow sensing device with the selected flow correction factor; and determining a signal output comprising the magnitude of mass air flowing past the unidirectional airflow sensing device to be the determined input flow signal of the airflow sensing device adjusted with the selected flow correction factor;

wherein determining the magnitude of reverse airflow based upon the determined input flow signal comprises:

characterizing the input flow signal of the airflow sensing device;

determining a flow mode based upon the characterized input flow signal, said determined flow mode comprising selecting one of: a no pulsing flow mode, a pulse flow mode, an onset of reverse flow mode and a reverse flow mode; and selecting the flow correction factor, based upon the determined flow mode and the characterized input flow signal; and wherein selecting the onset of reverse flow mode comprises detecting initial low levels of reverse airflow based upon a second derivative of the input flow signal of the airflow sensing device.

16. A method to compensate output of a conventional unidirectional mass airflow meter, comprising:

determining an input flow signal correlatable to a magnitude of mass air flowing past an airflow sensing device of the conventional mass airflow meter;

characterizing the input flow signal of the airflow sensing device;

determining a flow mode based upon the characterized input flow signal, said determined flow mode comprising selecting one of: a no pulsing flow mode, a pulse flow mode, an onset of reverse flow mode and a reverse flow mode; and, selecting the flow correction factor, based upon the determined flow mode and the characterized input flow signal;

determining a flow correction factor based upon a direction and the magnitude of the reverse airflow; and adjusting the determined input flow signal of the airflow sensing device with the determined flow correction factor;

wherein selecting the onset of reverse flow mode comprises detecting initial low levels of reverse airflow based upon a second derivative of the input flow signal of the airflow sensing device.

* * * * *